United States Patent
Cho et al.

(10) Patent No.: US 10,914,986 B2
(45) Date of Patent: *Feb. 9, 2021

(54) PHOTOLUMINESCENT PANEL, PHOTOLUMINESCENT LIQUID CRYSTAL DISPLAY DEVICE, AND METHOD OF MANUFACTURING THE PHOTOLUMINESCENT PANEL

(71) Applicant: Samsung Display Co., Ltd., Yongin (KR)

(72) Inventors: Hyun-Min Cho, Hwaseong-si (KR); Dae-Hyun Kim, Suwon-si (KR); Jae-Woong Kang, Jeonju-si (KR); Jae-Byung Park, Seoul (KR); Kwang-Keun Lee, Osan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/654,177

(22) Filed: Oct. 16, 2019

(65) Prior Publication Data

US 2020/0050060 A1     Feb. 13, 2020

Related U.S. Application Data

(63) Continuation of application No. 15/654,975, filed on Jul. 20, 2017, now Pat. No. 10,481,432, which is a (Continued)

(30) Foreign Application Priority Data

Dec. 10, 2012   (KR) .................. 10-2012-0142503

(51) Int. Cl.
    *G02F 1/13357*   (2006.01)
    *G02F 1/1335*    (2006.01)

(52) U.S. Cl.
    CPC .. *G02F 1/133617* (2013.01); *G02F 1/133504* (2013.01); *G02F 1/133514* (2013.01);
    (Continued)

(58) Field of Classification Search
    None
    See application file for complete search history.

(56) References Cited

U.S. PATENT DOCUMENTS 5,963,284 A   10/1999   Jones et al.
6,483,562 B1  11/2002   Fukuyoshi et al.
(Continued)

FOREIGN PATENT DOCUMENTS

JP    2004-528714 A      9/2004
KR    1020100088830 A    8/2010
(Continued)

*Primary Examiner* — Jessica M Merlin
*Assistant Examiner* — Mark D Teets
(74) *Attorney, Agent, or Firm* — Cantor Colburn LLP

(57) ABSTRACT

A photoluminescent panel includes a lower substrate, an upper substrate facing the lower substrate, a liquid crystal layer disposed between the lower substrate and the upper substrate, and a color conversion layer disposed on the upper substrate. The color conversion layer includes a light excitation particle which absorbs light having a desired wavelength and emits excited light, and a scattering particle which scatters the excited light.

15 Claims, 8 Drawing Sheets

Related U.S. Application Data continuation of application No. 13/904,254, filed on May 29, 2013, now Pat. No. 9,971,198.

(52) U.S. Cl.
CPC .......... *G02F 1/133553* (2013.01); *G02F 2001/133614* (2013.01); *G02F 2202/36* (2013.01); *Y10T 29/49826* (2015.01)

(56) References Cited

U.S. PATENT DOCUMENTS

| | | | |
|---|---|---|---|
| 6,611,305 B2 | 8/2003 | Kamijo et al. | |
| 6,686,676 B2 | 2/2004 | McNulty et al. | |
| 7,579,203 B2 | 8/2009 | Yamazaki et al. | |
| 7,986,018 B2 | 7/2011 | Rennie | |
| 8,294,848 B2 | 10/2012 | Cho et al. | |
| 9,971,198 B2 * | 5/2018 | Cho | G02F 1/133617 |
| 10,481,432 B2 * | 11/2019 | Cho | G02F 1/133617 |
| 2010/0188615 A1 | 7/2010 | Hung et al. | |
| 2010/0193806 A1 | 8/2010 | Byun | |
| 2010/0201909 A1 | 8/2010 | Jung et al. | |
| 2010/0208172 A1 | 8/2010 | Jang et al. | |
| 2012/0019740 A1 | 1/2012 | Kadowaki et al. | |
| 2012/0087103 A1 | 4/2012 | Dai et al. | |
| 2012/0087107 A1 | 4/2012 | Kunimasa et al. | |
| 2013/0002986 A1 | 1/2013 | Kadowaki et al. | |
| 2013/0299816 A1 | 11/2013 | Bessho et al. | |
| 2015/0131029 A1 | 5/2015 | Kaida et al. | |
| 2016/0357039 A1 | 12/2016 | Kim et al. | |

FOREIGN PATENT DOCUMENTS

| | | |
|---|---|---|
| KR | 1020100089606 A | 8/2010 |
| KR | 1020100111103 A | 10/2010 |
| KR | 1020120097774 A | 9/2012 |
| KR | 1020120113191 A | 10/2012 |
| WO | 2011145247 A1 | 11/2011 |
| WO | 2012090786 A1 | 7/2012 |

* cited by examiner

PHOTOLUMINESCENT PANEL, PHOTOLUMINESCENT LIQUID CRYSTAL DISPLAY DEVICE, AND METHOD OF MANUFACTURING THE PHOTOLUMINESCENT PANEL

This application is a continuation application of U.S. application Ser. No. 15/654,975 filed Jul. 20, 2017, which is a continuation application of U.S. application Ser. No. 13/904,254 filed May 29, 2013 and issued as U.S. Pat. No. 9,971,198 on May 15, 2018, which claims priority to Korean Patent Application No. 10-2012-0142503, filed on Dec. 10, 2012, and all the benefits accruing therefrom under 35 U.S.C. § 119, the contents of which in its entirety is herein incorporated by reference.

BACKGROUND

1. Field

Exemplary embodiments of the invention relate to a photoluminescent panel, photoluminescent liquid crystal display device having the same, and a method for manufacturing the photoluminescent panel. More particularly, exemplary embodiments of the invention relate to a photoluminescent panel, photoluminescent liquid crystal display device, and a method of manufacturing the photoluminescent panel for improving light emitting efficiency.

2. Description of the Related Art

Generally, a photoluminescent liquid crystal display apparatus (hereinafter, "PL-LCD") is a liquid crystal display device which substitutes a color filter pattern and a fluorescent lamp of a conventional liquid crystal display device for a fluorescent pattern and an ultraviolet lamp, respectively. The PL-LCD displays an image using a visible light emitted from a color conversion layer when an outer or external light having a short wavelength is illuminated on the color conversion layer.

SUMMARY

One or more exemplary embodiment of the invention provides a photoluminescent panel for improving light emitting efficiency.

Another exemplary embodiment of the invention provides a photoluminescent liquid crystal display device having the photoluminescent panel.

Yet another exemplary embodiment of the invention provides a method of manufacturing the photoluminescent panel.

In an exemplary embodiment of a photoluminescent panel according to the invention, the photoluminescent panel includes a lower substrate, an upper substrate facing the lower substrate, a liquid crystal layer disposed between the lower substrate and the upper substrate, and a color conversion layer disposed on the upper substrate. The color conversion layer includes a light excitation particle which absorbs light having a desired wavelength and emits excited light, and a scattering particle which scatters the excited light.

In an exemplary embodiment, the color conversion layer may further include a reflection wall which reflects the excited light.

In an exemplary embodiment, the color conversion layer may further include a first area in which the light excitation particle is disposed and a second area in which the scattering particle is disposed. The first area may be above the second area.

In an exemplary embodiment, the color conversion layer may further include a first area in which the light excitation particle is disposed and a second area in which the scattering particle is disposed. The first area may be below the second area.

In an exemplary embodiment, the color conversion layer may further include a plurality of light excitation particles and a plurality of scattering particles interspersed with each other within the color conversion layer.

In an exemplary embodiment, the color conversion layer may further include a light blocking pattern, and the reflection wall may be extended in a substantially perpendicular direction with respect to a lower surface of the light blocking pattern.

In an exemplary embodiment, a cross-sectional side surface of the light blocking pattern may have a curved or stepped shape, the reflection wall may contact and cover the cross-sectional side surface of the light blocking pattern, and an end portion of the reflection wall may be extended in a substantially perpendicular direction with respect to the lower surface of the light blocking pattern.

In an exemplary embodiment, the color conversion layer may further include a plurality of the light excitation particles emitting different color lights, and the color lights emitted at opposing sides of the reflection wall are different from each other.

In an exemplary embodiment, the light blocking pattern may have a first width at an upper portion thereof and a second width at a lower portion thereof. The first width may be different from the second width.

In an exemplary embodiment, the light blocking pattern may have a tilted cross-sectional side surface, and the reflection wall may contact and cover the tilted cross-sectional side surface of the light blocking pattern.

In an exemplary embodiment, the color conversion layer may further include a plurality of light excitation particles emitting different color lights, and the light excitation particles may include at least two materials among a green phosphor, a red phosphor and a yellow phosphor.

In an exemplary embodiment, the color conversion layer may further include a plurality of light excitation particles emitting different color lights, and the light excitation particle may include at least two materials among a green quantum dot, a red quantum dot and a blue quantum dot.

In an exemplary embodiment, the scattering particle may include titanium oxide or silicon oxide.

In an exemplary embodiment of a photoluminescent liquid crystal display device according to the invention, the photoluminescent liquid crystal display device includes a backlight unit which emits light having a desired wavelength, a first substrate disposed on the backlight unit, a second substrate facing the first substrate and disposed on the first substrate, a liquid crystal layer disposed between the first and the second substrates, and a color conversion layer disposed on the second substrate. The color conversion layer includes a plurality of light excitation particles which absorbs the light to emit excited lights having three different colors, and a scattering particle which scatters the excited lights.

In an exemplary embodiment, the color conversion layer may further include a reflection wall which reflects the excited lights and a light blocking pattern which blocks the excited lights.

In an exemplary embodiment, the reflection wall may be extended in a substantially perpendicular direction with respect to a lower surface of the light blocking pattern.

In an exemplary embodiment, the device may further include an optical filter layer between the color conversion layer and the second substrate.

In an exemplary embodiment of a method of manufacturing a photoluminescent panel according to the invention, the method of manufacturing the photoluminescent panel includes providing a light blocking pattern and a plurality of color areas spaced apart from each other on a substrate, providing a light excitation pattern on the color areas to define a gap corresponding to the light blocking pattern which is between adjacent color areas, providing a reflection member in the gap and on a portion of the light excitation pattern which is exposed by the gap, and providing a flattening layer on the light excitation pattern and the reflection member. The light excitation pattern includes a light excitation particle which emits excited light having a desired color.

In an exemplary embodiment, the flattening layer may include scattering particle which scatters the excited light.

In an exemplary embodiment, the plurality of color areas may include a first color area, a second color area, and a third color area. The providing a light excitation pattern on the color areas may include providing a first light excitation pattern on the first color area, providing a second light excitation pattern on the second color area and providing a third light excitation pattern on the third color area. The first light excitation pattern may include a first light excitation particle which emits a first excited light having a first color. The second light excitation pattern may include a second light excitation particle which emits a second excited light having a second color. The third light excitation pattern may include a third light excitation particle which emits a third excited light having a third color.

According to one or more exemplary embodiment of the photoluminescent panel, the photoluminescent liquid crystal display device, and the method of manufacturing the photoluminescent panel, excited light from a light excitation particle may be scattered by a scattering particle within a color conversion layer to improve light emitting efficiency.

Also, the excited light and scattered light may be reflected upward by a reflection wall to improve light emitting efficiency.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION

Figure 1:
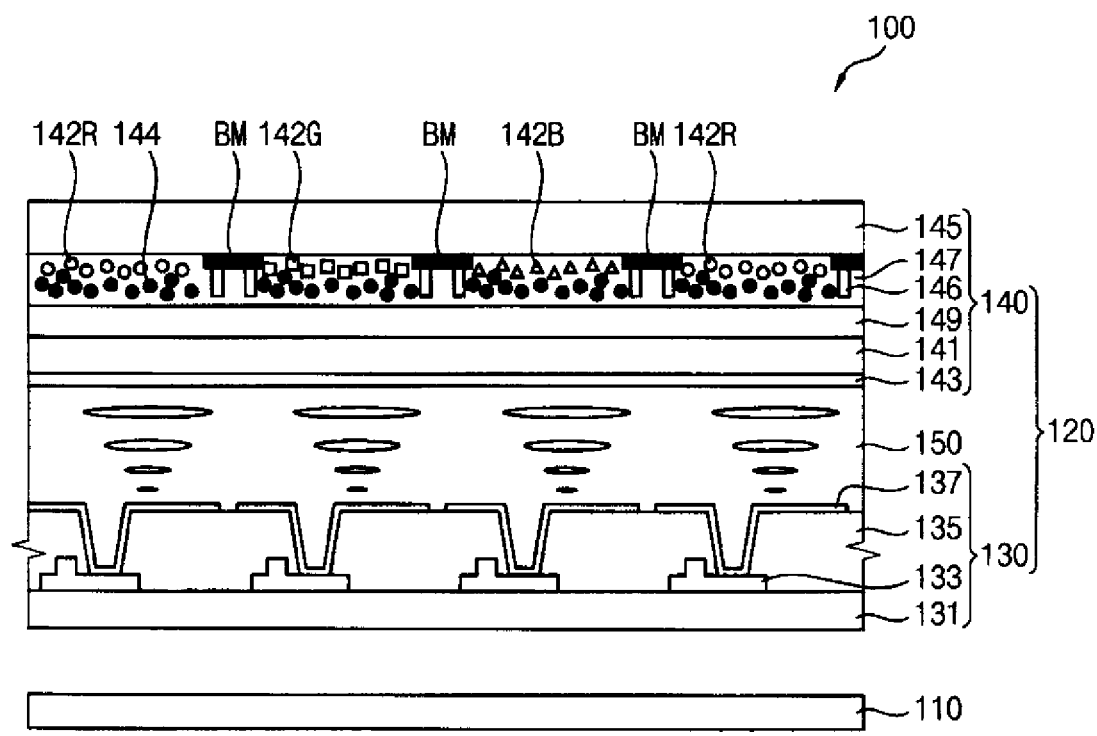
FIG. 1 is a cross-sectional view of an exemplary embodiment of a photoluminescent liquid crystal display device according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

In a conventional liquid crystal display device, an amount of light emitted from a backlight unit is reduced by about one third (⅓) due to a red color filter, a green color filter and a blue color filter of the conventional liquid crystal display device. To address the reduction in light, a photoluminescent liquid crystal display (hereinafter, "PL-LCD") apparatus includes light excitation particles in a color conversion layer, which emit different color lights. However, most of excited lights from the light excitation particles in the color conversion layer are totally reflected inward when the excited lights pass through a substrate or air which covers the color conversion layer. Accordingly, about 10% of original or incident light of the backlight unit is emitted outward to reduce light emitting efficiency of the PL-LCD.

FIG. 1 is a cross-sectional view of an exemplary embodiment of a PC-LCD device according to the invention.

Referring to FIG. 1, an exemplary embodiment of a PL-LCD device 100 according to the invention includes a backlight unit 110 and a photoluminescent panel 120 displaying an image in response to light from the backlight unit 110.

The backlight unit 110 emits the light having a desired wavelength such as ultraviolet waveband or blue light waveband toward the photoluminescent panel 120. The backlight unit 110 includes a light source (not shown) generating and emitting the light having the desired wavelength. In one exemplary embodiment, for example, the light source may emit light having a wavelength from about 200 nanometers to about 400 nanometers. The backlight unit 110 further includes a light guide plate (not shown) guiding the light from the light source to the photoluminescent panel 120.

The photoluminescent panel 120 includes an array substrate 130, a facing substrate 140, and a liquid crystal layer 150 disposed between the array substrate 130 and the facing substrate 140. The photoluminescent panel 120 adjusts transmissivity of the light from the backlight unit 110 to display an image.

The array substrate 130 includes a first transparent substrate 131, a switching element 133 disposed on a pixel area of the first transparent substrate 131, an insulation layer 135 partially exposing an electrode of the switching element 133, and a pixel electrode 137 electrically connected to an output electrode of the switching element 133 and disposed on the pixel area. The output electrode of the switching element 133 is exposed by the insulation layer 135. The array substrate 130 may further include a gate line (not shown) disposed on the first transparent substrate 131 and elongated to extend in a first direction and a data line (not shown) disposed on the first transparent substrate 131 and elongated to extend in a second direction crossing the first direction.

The switching element 133 includes a thin film transistor having a source electrode, a drain electrode and a gate electrode. In one exemplary embodiment, for example, the thin film transistor may have a bottom-gate structure which the gate electrode is disposed at a lower layer of the array substrate 130, and the source and the drain electrodes are disposed at an upper layer of the array substrate 130. Alternatively, the thin film transistor may have a top-gate structure which the gate electrode is disposed at the upper layer, and the source and the drain electrodes are disposed at the lower layer.

The facing substrate 140 includes a second transparent substrate 141, a common electrode 143 disposed on a first surface of the second transparent substrate 141, a third transparent substrate 145 disposed on an opposing second surface of the second transparent substrate 141 and facing the second transparent substrate 141, and a color conversion layer 147 disposed between the second transparent substrate 141 and the third transparent substrate 145. The facing substrate 140 may further include an intermediate layer 149 between the second transparent substrate 141 and the color conversion layer 147. The facing substrate 140 may further include a polarizing film (not shown) between the second transparent substrate 141 and the color conversion layer 147.

The second and the third transparent substrates 141 and 145 include a transparent material. In one exemplary embodiment, for example, the second and the third transparent substrates 141 and 145 may include glass or plastic.

The common electrode 143 includes a transparent conductive material. A common voltage is applied to the common electrode 143.

The color conversion layer 147 includes a light excitation particle 142, a scattering particle 144 and a reflection wall 146. The light excitation particle 142, the scattering particle 144 and the reflection wall 146 may be disposed within a resin layer. In one exemplary embodiment, for example, the resin layer may include a silicon resin or a photoresist resin. The color conversion layer 147 may further include a light blocking pattern BM.

The light excitation particle 142 absorbs light having a desired wavelength to have an excited state. From the excited state, the light excitation particle 142 returns to a ground state emitting some amount of light energy. The light excitation particle 142 includes a phosphor or a quantum dot. In one exemplary embodiment, for example, the light excitation particle 142 may include oxynitride, nitride, silicate, aluminated, scatdate or oxyfluoride materials.

When the light excitation particle 142 is a phosphor, the light excitation particle 142 may be distributed within the color conversion layer 147 with a concentration of substantially 3 grams per cubic centimeter to about 4 grams per cubic centimeter. Also, the light excitation particle 142 may have a size of substantially 5 micrometers to about 20 micrometers. When a light excitation particle 142G includes a phase of the formula $Si_{6-z}L_zO_zN_{8-z}$ where L is a Group 13 element such as Al (e.g., β-SiAlON), (Ba, Sr)2SiO4:Eu or CaSc20:Ce, the light excitation particle 142G may emit excited light having a green wavelength. In one exemplary embodiment, for example, when the phosphor is α-SiAlON, the light excitation particle 142 may be distributed within the color conversion layer 147 with a concentration of substantially 3.2 grams per cubic centimeter. When a light excitation particle 142R includes CaAlSiN3:Eu, (Sr, Ca)AlSiN3:Eu or CaAlSi(ON)3:Eu, the light excitation particle 142R may emit excited light having a red wavelength. When a light excitation particle 142B includes Y3Al5O12:Ce or Tb3Al5O12:Ce, the light excitation particle 142B may emit excited light having a yellow wavelength. If a blue light is illuminated from the backlight unit 110 and the light excitation particle 142B includes the Y3Al5O12:Ce or Tb3Al5O12:Ce, then a white light may be emitted from the color conversion layer 147, when the excited light having the yellow wavelength due to the light excitation particle 142B and the blue light from the backlight unit 110 are mixed.

When the light excitation particle 142 is a quantum dot, the light excitation particle 142 may include II-VI type of quantum dots including CdSe/ZnS, CdSe/CdS/ZnS, ZnSe/ZnS or ZnTe/ZnSe. Alternatively, the light excitation particle 142 may include III—V type of quantum dots including InP/ZnS or a quantum dot including CuInS(2)/ZnS. When the light excitation particle 142 is a quantum dot, the light excitation particle 142 may be distributed within the color conversion layer 147 with a concentration of substantially 4 grams per cubic centimeter to about 5 grams per cubic centimeter. The light excitation particle 142 may have a size or dimension of substantially lower than about 10 nanometers. When the light excitation particle 142 includes the quantum dot, wavelengths of excited light from the light excitation particle 142 may be determined according to a size or dimension of the quantum dot. In one exemplary embodiment, for example, the excited light from the quantum dot may be red, green or blue colored light according to the size of the quantum dot. In one exemplary embodiment, for example, when the quantum dot includes CdSe/ZnS, the quantum dot may be distributed within the color conversion layer 147 with a concentration of substantially 4.43 grams per cubic centimeter.

The scattering particle 144 scatters the excited light emitted from the light excitation particle 142. The scattering particle 144 may include titanium oxide or silicon oxide. In one exemplary embodiment, for example, the scattering particle 144 may include TiO2 or SiO2. The scattering particle 144 may have a size of substantially lower than about 1 micrometer. In one exemplary embodiment, for example, the scattering particle 144 may be distributed within the color conversion layer 147 with a concentration of substantially 4.23 grams per cubic centimeter.

The reflection wall 146 reflects the excited light from the light excitation particle 142 and/or the excited light scattered by the scattering particle 144. The reflection wall 146 includes a reflective material which reflects visible or ultraviolet lights. In one exemplary embodiment, for example, the reflection wall 146 may include aluminum.

The light blocking pattern BM is disposed corresponding to boundaries of a pixel area to block light. The light blocking pattern BM overlaps the gate line and/or the data line. The light blocking pattern BM may include metal or organic materials having a high optical density. In one exemplary embodiment, for example, the light blocking pattern BM may include chromium.

The intermediate layer 149 includes an optical clean adhesive ("OCA") film, an optical filter layer or air layer. The intermediate layer 149 may reflect the excited light upward toward the third transparent substrate 145 when the excited light is scattered or reflected downward toward the liquid crystal layer 150 by the scattering particle 144 or the reflection wall 146, respectively.

Figure 2:
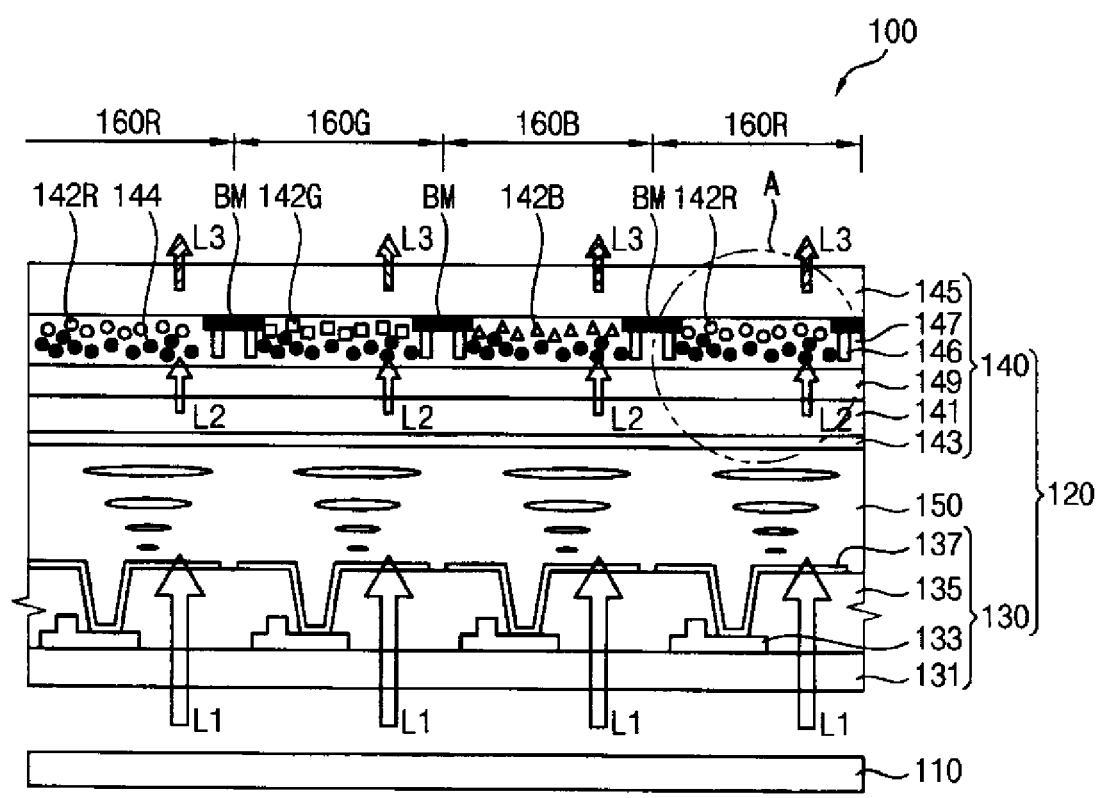
FIG. 2 is a cross-sectional view illustrating an exemplary embodiment of visible lights having different wavelengths emitted from the photoluminescent liquid crystal display device of FIG. 1.

FIG. 2 is a cross-sectional view illustrating an exemplary embodiment of visible lights having different wavelengths emitted from the PL-LCD device of FIG. 1.

Referring to FIG. 2, a first light L1 emitted from the backlight unit 110 passes through the array substrate 130 to arrive at the liquid crystal layer 150. Arrangement of liquid crystals in the liquid crystal layer 150 changes according to voltages applied to the pixel electrode 137 and the common electrode 143. An amount of first light L1 passing through the liquid crystal layer 150 is adjusted by the altered arrangement of the liquid crystals. A second light L2 of which an amount thereof is adjusted by the liquid crystal layer 150 arrives at the color conversion layer 147. The light excitation particle 142 in the color conversion layer 147 absorbs the second light L2 to have an excited state. Excited light is emitted from the light excitation particle 142 when the light excitation particle 142 returns to a ground state. The second light L2 passing through the color conversion layer 147 is converted to a third light L3.

The light excitation particle 142R in a first color area 160R of the color conversion layer 147 may emit excited light having red wavelength. The light excitation particle 142G in a second color area 160G of the color conversion layer 147 may emit excited light having green wavelength. The light excitation particle 142B in a third color area 160B of the color conversion layer 147 may emit excited light having blue wavelength. Alternatively, when the first light emitted from the backlight unit 110 is blue light, white light may be emitted from the third color area 160B by mixing of the blue light and excited light from the light excitation particle 142B in the third color area 160B.

Although the light excitation particle 142B is disposed in the third color area 160B in FIG. 2, a light excitation particle may not be disposed in the third color area 160B of the color conversion layer 147 when the first light L1 emitted from the backlight unit 110 is blue light. When the third color area 160B excludes a light excitation particle, luminance of the blue light emitted through the third color area 160B may be controlled solely by the liquid crystal layer 150 corresponding to the third color area 160B.

Figure 3:
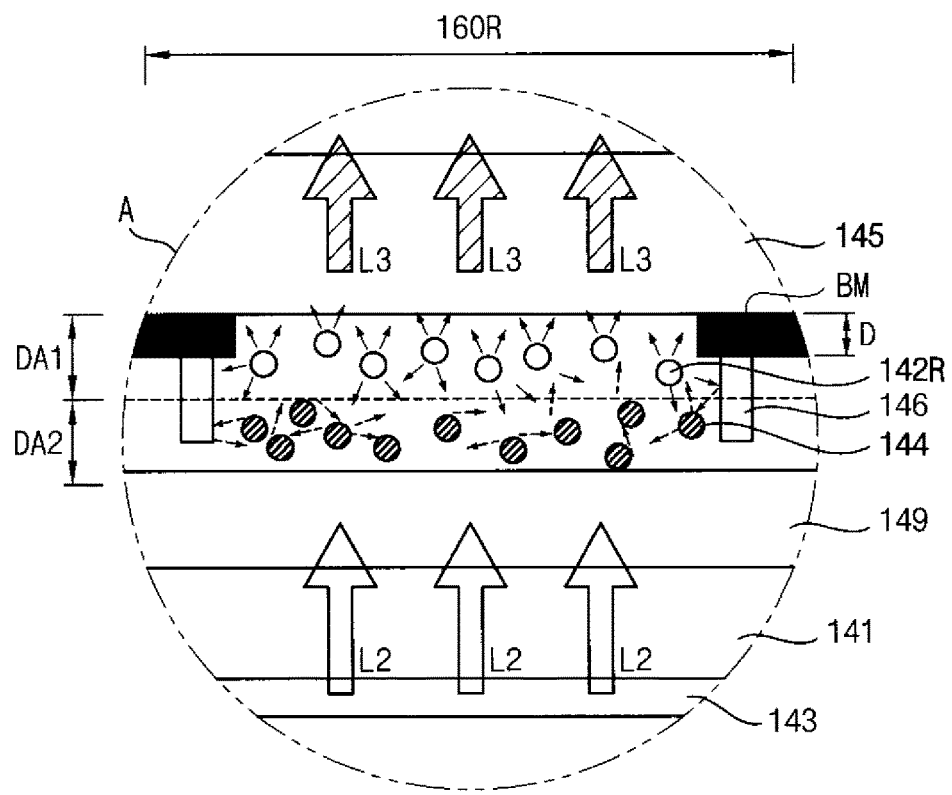
FIG. 3 is an enlarged cross-sectional view of portion 'A' of FIG. 2.

FIG. 3 is an enlarged cross-sectional view of portion 'A' of FIG. 2.

Referring to FIG. 1 and FIG. 3, a plurality of light excitation particles 142 is distributed (e.g., interspersed) in a first depth area DA1 of the color conversion layer 147. A plurality of scattering particles 144 is distributed in a second depth area DA2 of the color conversion layer 147. The first depth area DA1 may be positioned above the second depth area DA2 within the color conversion layer 147. The light excitation particles may include at least two materials among a green phosphor, a red phosphor and a yellow phosphor, but are not limited thereto or thereby. The light excitation particles may include at least two materials among a green quantum dot, a red quantum dot and a blue quantum dot, but are not limited thereto or thereby.

When viewed cross-sectionally, the light blocking pattern BM has a desired depth D, and a width taken parallel to the second or third transparent substrates 141 and 145. The light blocking member BM may have a first width UW at an upper portion thereof and a second width LW at a lower portion thereof. The first width UW may be substantially the same as the second width LW as illustrated in FIG. 1. The first width UW may at the third transparent substrate 145 side of the color conversion layer 147, while the second width LW may be at the second transparent substrate 141 side of the color conversion layer 147.

The reflection wall 146 is adjacent to an outer surface or edge of the light blocking pattern BM. In one exemplary embodiment, for example, the light blocking pattern BM may be disposed at an upper portion of the color conversion layer 147 and the reflection wall 146 may be adjacent to a lower surface of the light blocking pattern BM. When viewed cross-sectionally, the reflection wall 146 may be elongated in a substantially perpendicular direction to the lower surface of the light blocking pattern BM within the color conversion layer 147. The reflection wall 146 may be spaced apart from a lower boundary of the color conversion layer 147.

Hereinafter, a concept which the second light L2 passing through the color conversion layer 147 is converted to a third light L3 (e.g., visible light) which passes through an upper boundary of the color conversion layer 147 is described in detail.

The second light L2 passing through the liquid crystal layer 150 arrives at the color conversion layer 147. A portion of the second light L2 arriving at the color conversion layer 147 is absorbed by the light excitation particle 142 to be emitted as excited light. According to exemplary embodiments, another portion of the second light L2 (such as a remaining portion of the second light L2) which is not absorbed by the light excitation particle 142 may directly pass through the color conversion layer 147 to be emitted therefrom.

A portion of the excited light emitted from the light excitation particle 142 is scattered by the scattering particle 144. Another portion (such as a remaining portion) of the excited light emitted from the light excitation particle 142 is reflected by the reflection wall 146. That is, the third light L3 emitted from the color conversion layer 147 includes excited light directly emitted from the light excitation particle 142, excited light scattered upward by the scattering particle 144 and excited light reflected upward by the reflection wall 146. Also, the third light L3 emitted from the color conversion layer 147 may include excited light which is scattered first by the scattering particle 144 and then reflected upward by the reflection wall 146. Also, the third light L3 emitted from the color conversion layer 147 may include excited light which is reflected first by the reflection wall 146 and then scattered upward by the scattering particle 144. That is, the third light L3 includes all parts of excited light which is directly emitted from the light excitation particle 142, scattered and/or reflected by the scattering particle 144 and the reflection wall 146, respectively, and directed upward. The third light L3 may include the portion of the second light L2 which is not absorbed by the light excitation particle 142 and which directly passes through the color conversion layer 147, but the invention is not limited thereto or thereby.

When the intermediate layer 149 is disposed between the color conversion layer 147 and the second transparent substrate 141, excited light emitted downward directly from the light excitation particle 142, and excited light from the light excitation particle 142 which is scattered and/or reflected downward by the scattering particle 144 and the reflection wall 146 may be re-reflected by the intermediate layer 147 to be directed upward. Also, the re-reflected excited light may be scattered and/or reflected by the scattering particle 144 and the reflection wall 146 to pass through the upper boundary of the color conversion layer 147.

As mentioned above, the second light L2 passing through the liquid crystal layer 150 is converted to the third light L3 having a desired color wavelength by the light excitation particle 142. Then, the light may be directly emitted from the light excitation particle 142, and/or may be scattered and/or reflected upward by the scattering particle 144 and the reflection wall 146. Accordingly, light emitting efficiency of the photoluminescent panel may be improved.

Table 1 indicates an amount of excited light emitted outward according to an existence of a scattering particle 144 when a light excitation particle 142 includes a quantum dot. As the scattering particle 144, titanium dioxide was used in Table 1. As the quantum dot, a green quantum dot which emits excited light having a wavelength of about 492 nanometers to about 590 nanometers was used. Referring to Table 1, light emitting efficiency of an exemplary embodiment of the photoluminescent panel including the scattering particle 144 is increased to about 40%, as compared to a Comparative embodiment which excludes the scattering particle.

TABLE 1

|  | Comparative embodiment | Exemplary embodiment |
|---|---|---|
| Scattering particle | None | TiO2 layer having 100 nanometer (nm) |
| Light amount of green excited light [unit: watt per steradian (W/sr)] | $1.45 \times 10^{-5}$ | $2.02 \times 10^{-5}$ |

Figure 4:
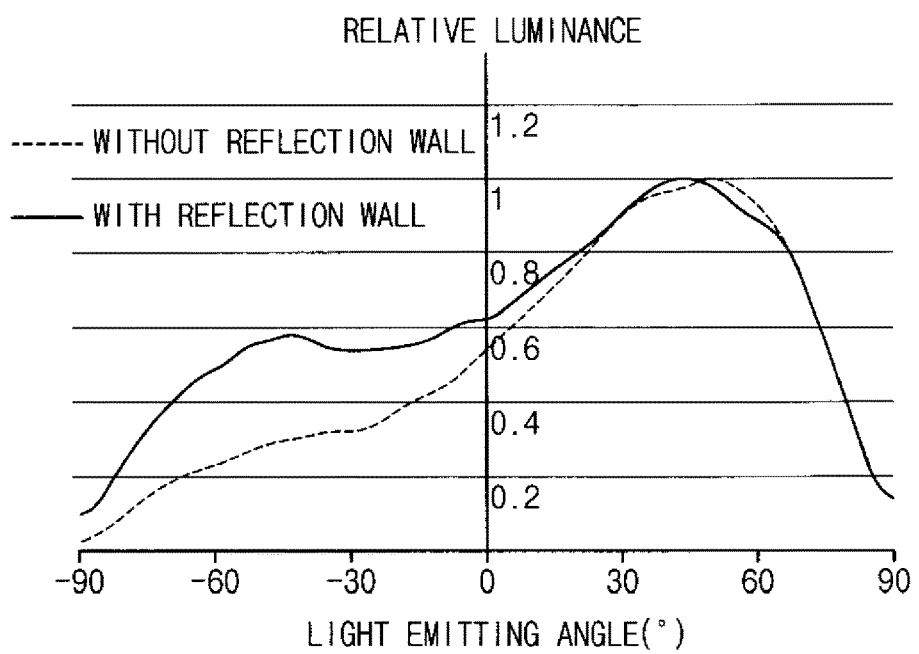
FIG. 4 is a graph illustrating luminance distribution of the photoluminescent panel of FIG. 2 with respect to a light emitting angle in degrees (°)

FIG. 4 is a graph illustrating luminance distribution of the photoluminescent panel of FIG. 2 with respect to a light emitting angle.

More particularly, FIG. 4 illustrates relative luminance of the photoluminescent panel of FIG. 2 with respect to a light emitting angle in degrees (°) when titanium dioxide having a diameter of 2 micrometers with a concentration of 200 per cubic millimeter is distributed in a polymethyl methacrylate ("PMMA") resin as the scattering particle of the color conversion layer. Light is directed toward the scattering particle in the PMMA resin and scattered light through an upper boundary of the PMMA resin was detected. Referring to FIG. 4, a light emitting angle of zero (0) represents an area in which the scattering particle is present within the PMMA resin. A positive angle along the horizontal axis represents a direction to which the light is directed within the PMMA resin while a negative angle along the horizontal axis represents a reverse direction from which the light is directed within the PMMA resin.

Referring to FIG. 4, where the PMMA resin in the color conversion layer further includes the reflection wall with the scattering particle, relative luminance in areas in the reverse direction is considerably increased compared to a PMMA resin without the reflection wall. In particular, luminance at an angle of zero (0) is increased to about 10%, and luminance at minus 40 degrees of light emitting angle is almost doubled.

As mentioned above, excited light emitted from the light excitation particle may be scattered and/or reflected by the scattering particle and the reflection wall in the color conversion layer to improve light emitting efficiency. Also, excited light totally reflected inward at an upper boundary of the color conversion layer and returning to the color conversion layer may be reduced to improve light emitting efficiency of the photoluminescent panel.

FIGS. 5A to 5G are cross-sectional views illustrating an exemplary embodiment of a method of manufacturing a facing substrate of a photoluminescent panel, such as the facing substrate 140 of FIG. 1.

Figure 5A:
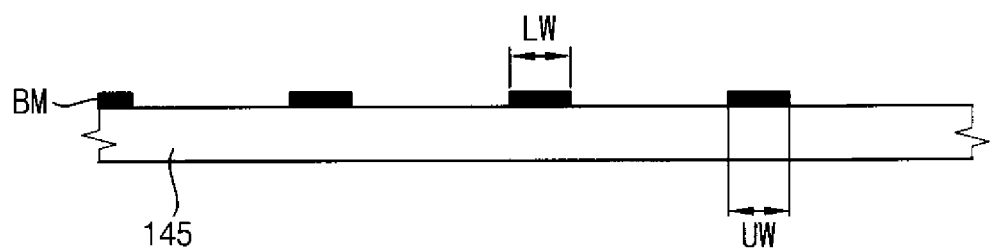
FIGS. 5A to 5G are cross-sectional views illustrating an exemplary embodiment of a method of manufacturing a facing substrate of the photoluminescent panel of FIG. 1.

Referring to FIG. 5A, a chromium layer is formed (e.g., provided) on the third transparent substrate 145, and a photoresist is provided on the chromium layer. Then, the photoresist is selectively illuminated and developed using a mask (not shown) to form the light blocking pattern BM in a desired area on the third transparent substrate 145. In a plan view of the third transparent substrate 145, the light blocking pattern BM may have substantially lattice shape corresponding to the gate line and the data line of the array substrate, but is not limited thereto or thereby. The first width UW of the light blocking pattern BM may be taken at a first end thereof adjacent to the third transparent substrate 145, and the second width LW may be taken at a distal second end of thereof, each width being taken substantially parallel to the third transparent substrate 145.

Figure 5B:

Referring to FIG. 5B, a first light excitation pattern 148R including a light excitation particle 142R which emits excited light having a first color is formed in a first color area 160R on the third transparent substrate 145 including the light blocking pattern BM thereon. More particularly, a resin layer including the light excitation particle 142R is provided on the third transparent substrate 145 including the light blocking pattern BM thereon, and then the resin layer is selectively illuminated and developed to form the first light excitation pattern 148R including the light excitation particle 142R which emits excited light having the first color in the first color area 160R.

Figure 5C:
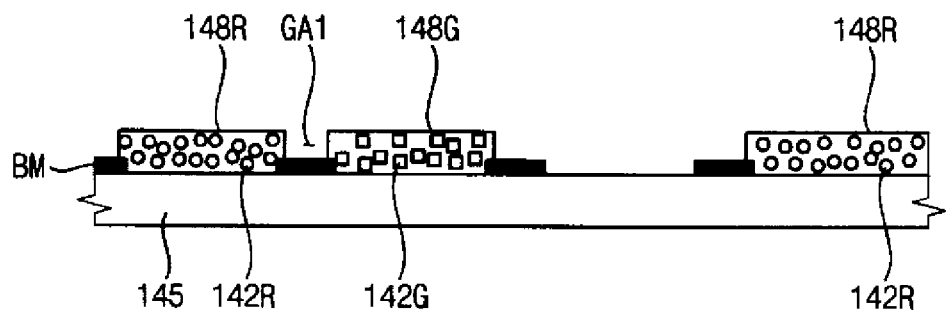

Referring to FIG. 5C, a second light excitation pattern 148G including a light excitation particle 142G which emits excited light having a second color is formed in a second color area 160G on the third transparent substrate 145 including the first light excitation pattern 148R thereon. More particularly, a resin layer including the light excitation particle 142G is provided on the third transparent substrate 145 including the first light excitation pattern 148R and the light blocking pattern BM thereon, and then the resin layer is selectively illuminated and developed to form the second light excitation pattern 148G including the light excitation particle 142G which emits excited light having the second color in the second color area 160G Also, a first gap GA1 is defined between the first light excitation pattern 148R and the second light excitation pattern 148G The first gap GA1 is disposed corresponding to and overlapping the light blocking pattern BM between the first light excitation pattern 148R and the second light excitation pattern 148G. Furthermore, a portion of side surfaces of the first light excitation pattern 148R and the second light excitation pattern 148G facing each other, is exposed by the first gap GA1.

Figure 5D:
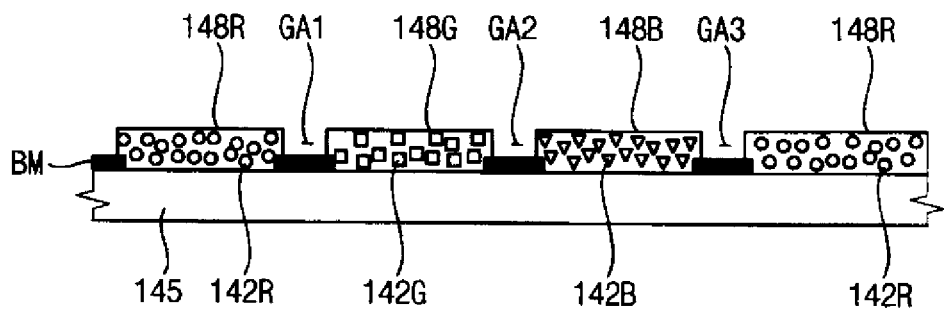

Referring to FIG. 5D, a third light excitation pattern 148B including a light excitation particle 142B which emits excited light having a third color is formed in a third color area 160B on the third transparent substrate 145 including the second light excitation pattern 148G thereon. More particularly, a resin layer including the light excitation particle 142B is provided on the third transparent substrate 145 including the light blocking pattern, the first light excitation pattern 148R and the second light excitation pattern 148G thereon, and then the resin layer is selectively illuminated and developed to form the third light excitation pattern 148B including the light excitation particle 142B which emits excited light having the third color in the third color area 160B. Also, a second gap GA2 is defined between the second light excitation pattern 148G and the third light excitation pattern 148B. The second gap GA2 is disposed corresponding to and overlapping the light blocking pattern BM between the second light excitation pattern 148G and the third light excitation pattern 148B. Furthermore, a portion of side surfaces of the second light excitation pattern 148G and the third light excitation pattern 148B facing each other, is exposed by the second gap GA2. A third gap GA3 is defined between the third light excitation pattern 148B and the first light excitation pattern 148R. The third gap GA3 is disposed corresponding to and overlapping the light blocking pattern BM between the third light excitation pattern 148B and the first light excitation pattern 148R. Furthermore, a portion of side surfaces of the third light excitation pattern 148B and the first light excitation pattern 148R facing each other, is exposed by the third gap GA3.

Although the light excitation patterns 148R, 148G and 148B are formed in a sequence of red, green and blue in FIGS. 5B to 5D, the sequence in which the light excitation patterns 148 are formed may be various. Also, although the first light excitation pattern 148R including the light excitation particle 142R which emits excited light having the first color, the second light excitation pattern 148G including the light excitation particle 142G which emits excited light having the second color, and the third light excitation pattern 148B including the light excitation particle 142B which emits excited light having the third color were sequentially formed in FIGS. 5B to 5D, the light excitation patterns 148 may be formed as a process that a resin pattern without the light excitation particles 142 is formed on the third transparent substrate 145 and then the light excitation particles 142R, 142Q 142B may be injected to the resin pattern corresponding to each color areas.

Figure 5E:
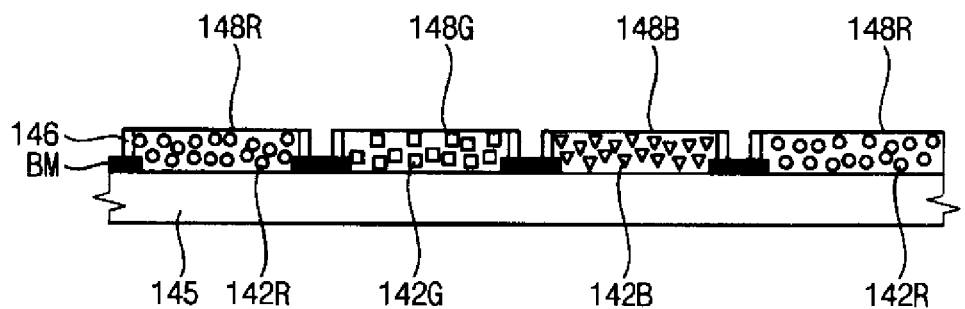

Referring to FIG. 5E, the reflection wall 146 is formed on the facing side surfaces of the light excitation patterns 148 which are exposed by the first gap GA1, the second gap GA2 and the third gap GA3. The reflection wall 146 may be formed at the first, the second and the third gaps GA1, GA2 and GA3 to totally fill or partially fill each of the gaps GA1, GA2 GA3. In one exemplary embodiment, for example, a reflection layer may be formed on the light excitation patterns 148 and the light blocking pattern BM using methods such as physical vapor deposition ("PVD"), chemical vapor deposition ("CVD") or electroplating. Then an etch mask may be provided corresponding to the gaps GA1, GA2 and GA3 to form the reflection wall 146 by etching the reflection layer. Alternatively, the reflection layer may be anisotropcially dry etched corresponding to the gaps GA1, GA2 and GA3 to form the reflection wall 146. Accordingly, the reflection wall 146 having a desired cross-sectional shape may be formed in a portion or whole of the gaps GA1, GA2 and GA3.

The cross-sectional shape of the reflection wall 146 may be various according to exemplary embodiments. In the exemplary embodiment of FIGS. 5E to 5G for example, the cross-sectional shape of the reflection wall 146 is substantially linear and perpendicular to a surface of the light blocking pattern BM.

Figure 5F:
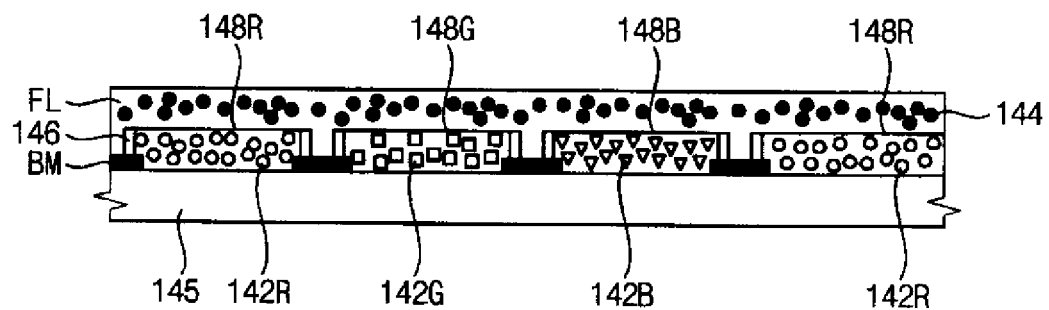

Referring to FIG. 5F, a flattening layer FL is formed on the third transparent substrate 145 including the light excitation patterns 148 thereon. The flattening layer FL includes the scattering particle 144 therein. The flattening layer FL may include substantially the same material as the light excitation patterns 148. According to alternative exemplary embodiments, the flattening layer FL may further include light excitation particles 142 which emit different color lights corresponding to each of the color areas 160. The light excitation particles may include at least two materials among a green phosphor, a red phosphor and a yellow phosphor, but are not limited thereto or thereby. The light excitation particles may include at least two materials among a green quantum dot, a red quantum dot and a blue quantum dot, but are not limited thereto or thereby.

Figure 5G:
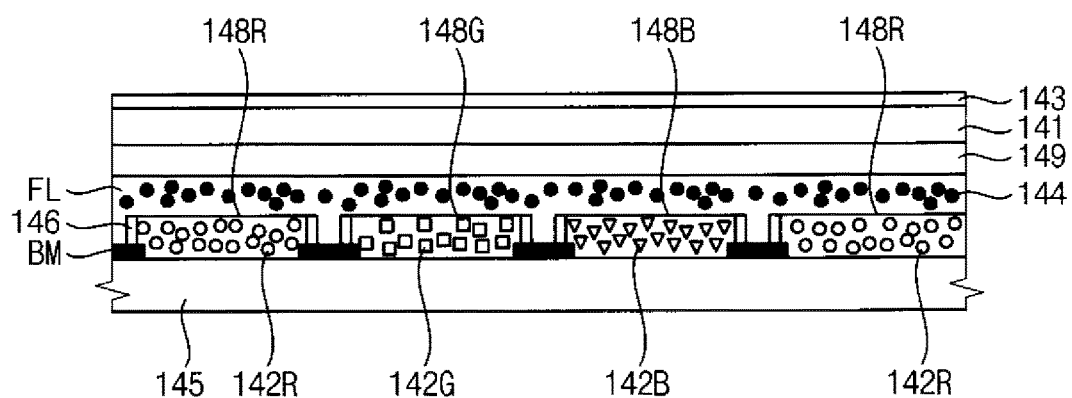

Referring to FIG. 5G the third transparent substrate 145 including the flattening layer FL therein is assembled with a first surface of the second transparent substrate 141, and a common electrode layer 143 is formed on an opposing second surface of the second transparent substrate 141. According to exemplary embodiments, a polarizing film, an optical film layer or an OCA film may be disposed between the second and the third transparent substrates 141 and 145.

Figure 6:
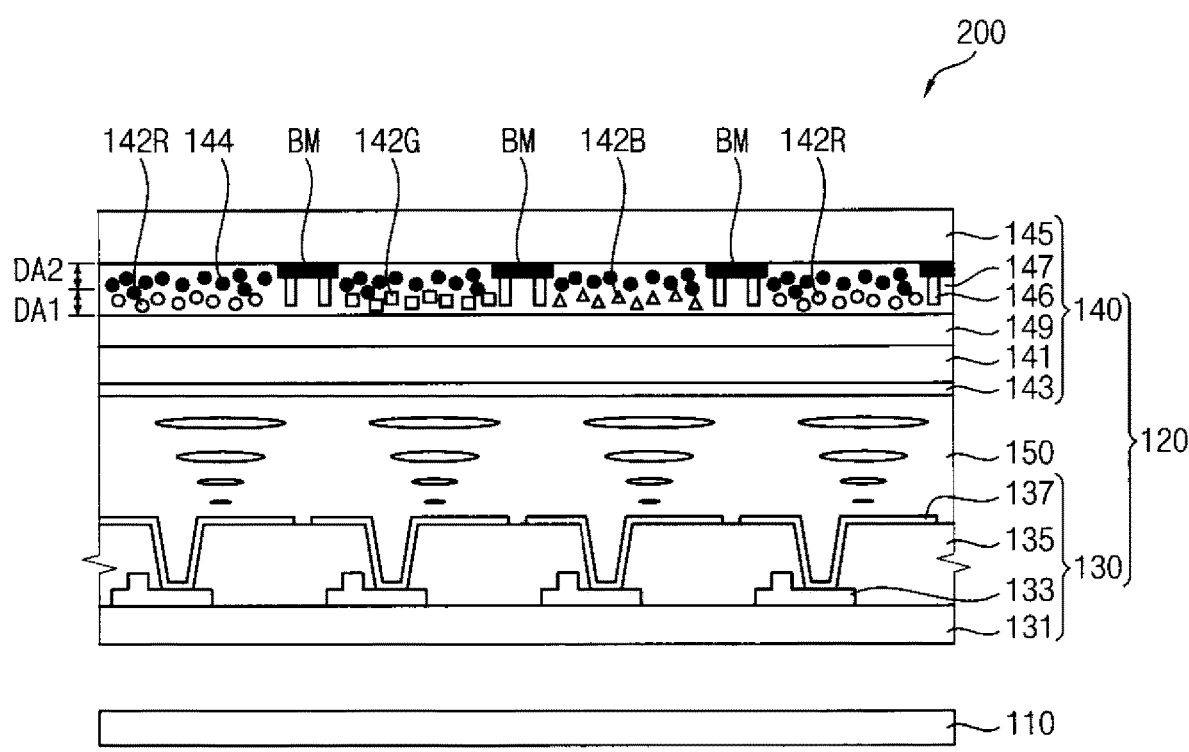
FIG. 6 is a cross-sectional view of another exemplary embodiment of a photoluminescent liquid crystal display device according to the invention.

FIG. 6 is a cross-sectional view of another exemplary embodiment of a PL-LCD device according to the invention.

Referring to FIG. 6, an exemplary embodiment of a PL-LCD device 200 according to the invention includes a backlight unit 110 and a photoluminescent panel 120 displaying an image in response to light from the backlight unit 110. The exemplary embodiment of the PL-LCD device 200 according to the invention is substantially the same as the PL-LCD device 100 of FIG. 1 except for a location of depth areas DA1 and DA2 in which a plurality of light excitation particles 142 and a plurality of scattering particles 144 is distributed (e.g., interspersed) within a color conversion layer 147.

The backlight unit 110 emits the light having a desired wavelength such as ultraviolet waveband or blue light waveband toward the photoluminescent panel 120. The backlight unit 110 includes a light source (not shown) generating and emitting the light having the desired wavelength.

The photoluminescent panel 120 includes an array substrate 130, a facing substrate 140, and a liquid crystal layer 150 disposed between the array substrate 130 and the facing substrate 140. The photoluminescent panel 120 adjusts transmissivity of the light from the backlight unit 110 to display an image.

The array substrate 130 includes a first transparent substrate 131, a switching element 133 disposed on a pixel area of the first transparent substrate 131, an insulation layer 135 partially exposing an electrode of the switching element 133, and a pixel electrode 137 electrically connected to an output electrode of the switching element 133 and disposed on the pixel area.

The facing substrate 140 includes a second transparent substrate 141, a common electrode 143 disposed on a first surface of the second transparent substrate 141, a third transparent substrate 145 disposed on an opposing second surface of the second transparent substrate 141 and facing the second transparent substrate 141, and a color conversion layer 147 disposed between the second transparent substrate 141 and the third transparent substrate 145. The facing substrate 140 may further include an intermediate layer 149 between the second transparent substrate 141 and the color conversion layer 147. The facing substrate 140 may further include a polarizing film (not shown) between the second transparent substrate 141 and the color conversion layer 147.

The color conversion layer 147 includes a light excitation particle 142, a scattering particle 144 and a reflection wall 146. The light excitation particle 142, the scattering particle 144 and the reflection wall 146 may be disposed within a resin layer. In one exemplary embodiment, for example, the resin layer may include a silicon resin or a photoresist resin. The color conversion layer 147 may further include a light blocking pattern BM.

The light excitation particle 142 absorbs light having a desired wavelength to have an excited state. From the excited state, the light excitation particle 142 returns to a ground state emitting some amount of light energy. The light excitation particle 142 includes a phosphor or a quantum dot.

The scattering particle 144 scatters the excited light emitted from the light excitation particle 142.

The reflection wall 146 reflects the excited light from the light excitation particle 142 and/or the excited light scattered by the scattering particle 144.

The light blocking pattern BM is disposed corresponding to boundaries of a pixel area to block light. The light blocking pattern BM overlaps a gate line (not shown) and a data line (not shown).

In the illustrated exemplary embodiment of FIG. 6, a plurality of light excitation particles 142 is distributed in a first depth area DA1 of the color conversion layer 147. A plurality of scattering particles 144 is distributed in a second depth area DA2 of the color conversion layer 147. The first depth area DA1 is positioned below the second depth area DA2 within the color conversion layer 147.

When viewed cross-sectionally, the light blocking pattern BM has a desired depth D and a width. In the illustrated exemplary embodiment of FIG. 6, an upper width UW of the light blocking pattern BM is substantially the same as a lower width LW of the light blocking pattern BM, but is not limited thereto or thereby.

The reflection wall 146 is adjacent to an outer surface or edge of the light blocking pattern BM. In particular, for example, the light blocking pattern BM may be disposed at an upper portion of the color conversion layer 147, and the reflection wall 146 may be adjacent to a lower surface of the light blocking pattern BM. The reflection wall 146 may be disposed in a substantially perpendicular direction to the lower surface of the light blocking pattern BM within the color conversion layer 147.

Figure 7:
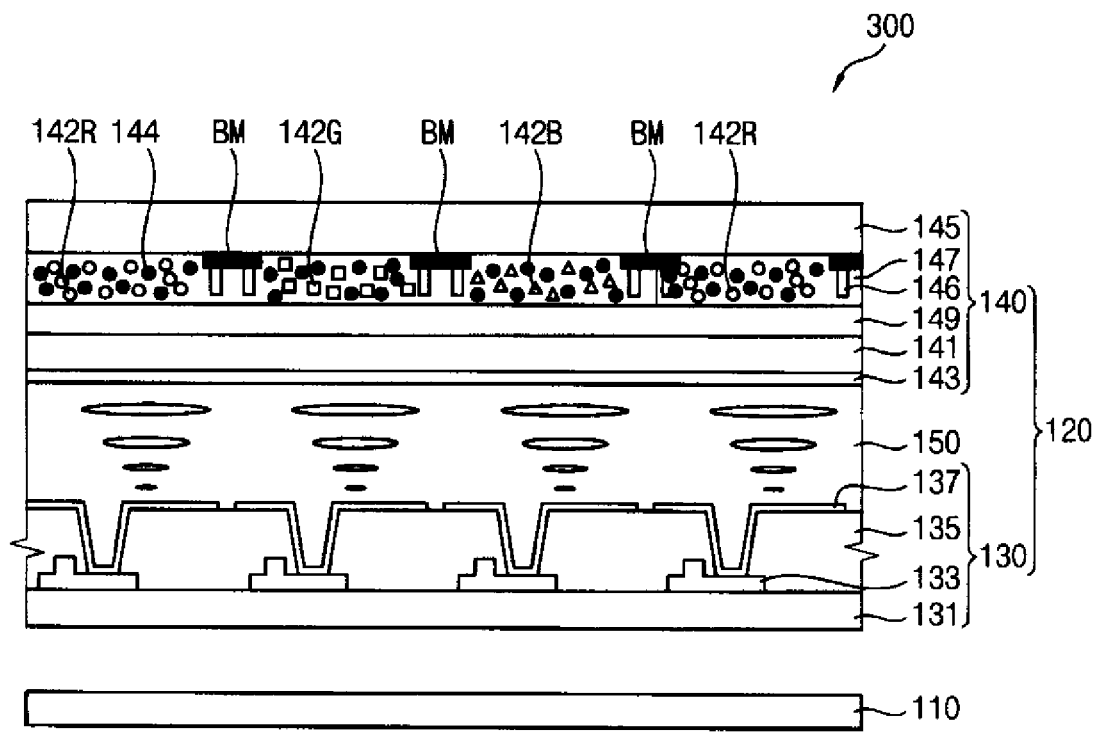
FIG. 7 is a cross-sectional view of another exemplary embodiment of a photoluminescent liquid crystal display device according to the invention.

FIG. 7 is a cross-sectional view of another exemplary embodiment of a PL-LCD device according to the invention.

Referring to FIG. 7, an exemplary embodiment of a PL-LCD device 300 according to the invention includes a backlight unit 110 and a photoluminescent panel 120 displaying an image in response to light from the backlight unit 110. The exemplary embodiment of the PL-LCD device 300 according to the invention is substantially the same as the PL-LCD device 100 of FIG. 1 except that a plurality of light excitation particles 142 and a plurality of scattering particles 144 are interspersed with each other within a color conversion layer 147 in contrast to being disposed in substantially stratified depth layers.

The backlight unit 110 emits the light having a desired wavelength such as ultraviolet waveband or blue light waveband toward the photoluminescent panel 120. The backlight unit 110 includes a light source (not shown) generating and emitting the light having the desired wavelength.

The photoluminescent panel 120 includes an array substrate 130, a facing substrate 140, and a liquid crystal layer 150 disposed between the array substrate 130 and the facing substrate 140. The photoluminescent panel 120 adjusts transmissivity of the light from the backlight unit 110 to display an image.

The array substrate 130 includes a first transparent substrate 131, a switching element 133 disposed on a pixel area of the first transparent substrate 131, an insulation layer 135 partially exposing an electrode of the switching element 133, and a pixel electrode 137 electrically connected to an output electrode of the switching element 133 and disposed on the pixel area.

The facing substrate 140 includes a second transparent substrate 141, a common electrode 143 disposed on a first surface of the second transparent substrate 141, a third transparent substrate 145 disposed on an opposing second surface of the second transparent substrate 141 and facing the second transparent substrate 141, and a color conversion layer 147 disposed between the second transparent substrate 141 and the third transparent substrate 145. The facing substrate 140 may further include an intermediate layer 149 between the second transparent substrate 141 and the color conversion layer 147. The facing substrate 140 may further include a polarizing film (not shown) between the second transparent substrate 141 and the color conversion layer 147.

The color conversion layer 147 includes a light excitation particle 142, a scattering particle 144 and a reflection wall 146. The light excitation particle 142, the scattering particle 144 and the reflection wall 146 may be disposed within a resin layer. In one exemplary embodiment, for example, the resin layer may include a silicon resin or a photoresist resin. The color conversion layer 147 may further include a light blocking pattern BM.

The light excitation particle 142 absorbs light having a desired wavelength to have an excited state. From the excited state, the light excitation particle 142 returns to a ground state emitting some amount of light energy. The light excitation particle 142 includes a phosphor or a quantum dot.

The scattering particle 144 scatters the excited light emitted from the light excitation particle 142.

The reflection wall 146 reflects the excited light from the light excitation particle 142 and/or the excited light scattered by the scattering particle 144.

The light blocking pattern BM is disposed corresponding to boundaries of a pixel area to block light. The light blocking pattern BM overlaps a gate line (not shown) and a data line (not shown).

In the illustrated exemplary embodiment of FIG. 7, a plurality of light excitation particles 142 and a plurality of scattering particles 144 are interspersed with each other within the color conversion layer 147. That is, the light excitation particles 142 are distributed at both upper and lower portions of the color conversion layer 147. Likewise, the scattering particles 144 are distributed at both the upper and the lower portions of the color conversion layer 147.

When viewed cross-sectionally, the light blocking pattern BM has a desired depth D and a width. In the illustrated exemplary embodiment of FIG. 7, an upper width UW of the light blocking pattern BM is substantially the same as a lower width LW of the light blocking pattern BM, but is not limited thereto or thereby.

The reflection wall 146 is adjacent to an outer surface or edge of the light blocking pattern BM. In particular, for example, the light blocking pattern BM may be disposed at the upper portion of the color conversion layer 147, and the reflection wall 146 may be adjacent to a lower surface of the light blocking pattern BM. The reflection wall 146 may be disposed in a substantially perpendicular direction to the lower surface of the light blocking pattern BM within the color conversion layer 147.

Figure 8:
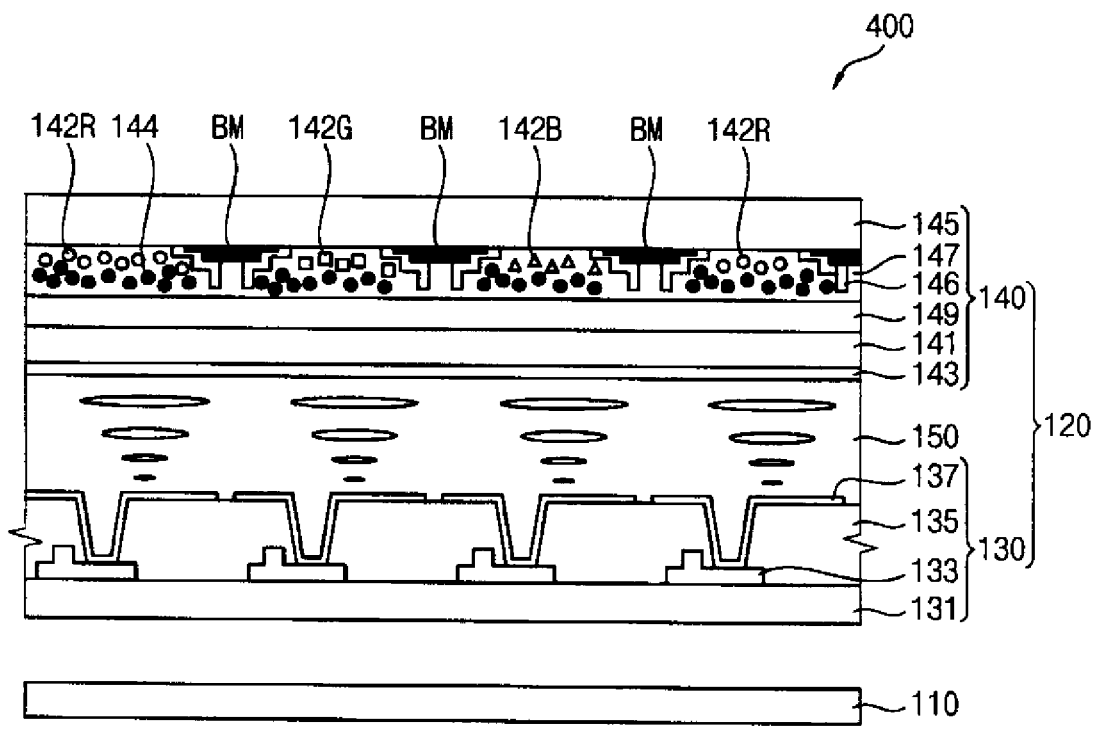
FIG. 8 is a cross-sectional view of another exemplary embodiment of a photoluminescent liquid crystal display device according to the invention.

FIG. 8 is a cross-sectional view of another exemplary embodiment of a PL-LCD device according to the invention.

Referring to FIG. 8, an exemplary embodiment of a PL-LCD device 400 according to the invention includes a backlight unit 110 and a photoluminescent panel 120 displaying an image in response to light from the backlight unit 110. The exemplary embodiment of PL-LCD device 400 according to the invention substantially the same as the PL-LCD device 100 of FIG. 1 except for cross-sectional shapes of a light blocking pattern BM and a reflection wall 146 within a color conversion layer 147. Hereinafter, detailed description of the identical elements is omitted.

The color conversion layer 147 of the photoluminescent panel 120 includes a light excitation particle 142, a scattering particle 144 and the reflection wall 146. The color conversion layer 147 may further include the light blocking pattern BM.

When viewed cross-sectionally, the light blocking pattern BM has an overall desired depth D and widths within the color conversion layer 147. An upper width UW of the light blocking pattern BM is substantially different from a lower width LW of the light blocking pattern BM. As illustrated in the exemplary embodiment of FIG. 8, an upper width UW of the light blocking pattern BM such as defined by an upper portion thereof, is larger than the lower width LW such as defined by a lower portion thereof. Also, the light blocking pattern BM has a curved or stepped side surface. In FIG. 8, for example, a difference in widths of the upper and lower portions of the light blocking pattern BM form a stepped profile side surface in the cross-sectional view. Alternatively, a difference in the upper and lower widths UW and LW may transition more gradually to form a curved profile side surface. The upper and lower portions of the light blocking pattern BM may be continuous with each other, such as to form a single, unitary, indivisible light blocking pattern BM, but is not limited thereto or thereby.

A first portion of the reflection wall 146 is adjacent to the curved or stepped side surface of the light blocking pattern BM, and may have a corresponding profile to the side surface of the light blocking pattern BM. A second portion of the reflection wall 146 connected and continuous with the first portion is elongated in a substantially perpendicular direction with respect to a lower surface of the light blocking pattern BM. The first and second portions of the reflection wall 146 may form a unitary, indivisible reflection wall 146, but is not limited thereto or thereby.

The reflection wall 146 having the above-described cross-sectional non-linear shape reflects more of the excited light emitted the light excitation particle 142 near a boundary of a color area within the color conversion layer 147.

Figure 9:
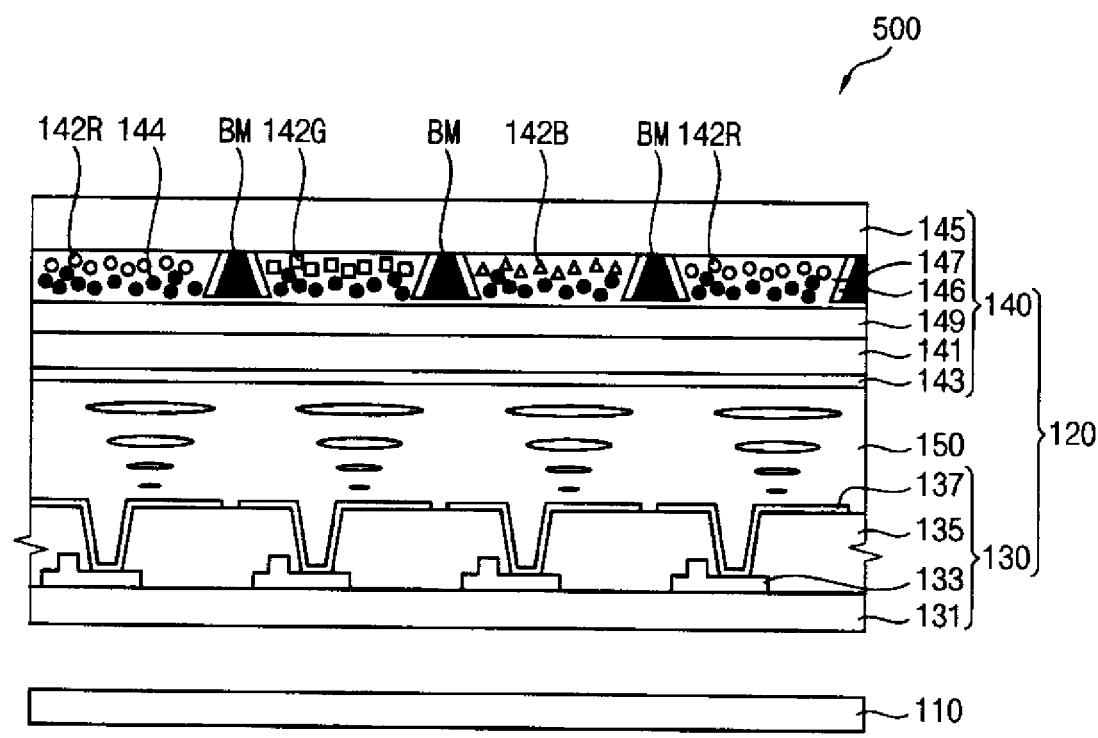
FIG. 9 is a cross-sectional view of another exemplary embodiment of a photoluminescent liquid crystal display device according to the invention.

FIG. 9 is a cross-sectional view of another exemplary embodiment of a PL-LCD device according to the invention.

Referring to FIG. 9, an exemplary embodiment of a PL-LCD device 500 according to the invention includes a backlight unit 110 and a photoluminescent panel 120 displaying an image in response to light from the backlight unit 110. The exemplary embodiment of the PL-LCD device 500 according to the invention is substantially the same as the PL-LCD device 100 of FIG. 1 except for cross-sectional shapes of a light blocking pattern BM and a reflection wall 146 within a color conversion layer 147. Hereinafter, detailed description of the identical elements is omitted.

The color conversion layer 147 of the photoluminescent panel 120 includes a light excitation particle 142, a scattering particle 144 and the reflection wall 146. The color conversion layer 147 may further include the light blocking pattern BM.

When viewed cross-sectionally, the light blocking pattern BM has a desired depth D and widths within the color conversion layer 147. An upper width UW of the light blocking pattern BM is substantially different from a lower width LW of the light blocking pattern BM. As illustrated in the exemplary embodiment of FIG. 9, the upper width UW of the light blocking pattern BM is narrower than the lower width LW of the light blocking pattern BM. Also, the light blocking pattern BM has a tilted or inclined side surface. The depth D of the light blocking pattern BM is substantially equal to or less than depth of the color conversion layer 147. The inclined side surfaces and the substantially planar upper and lower surfaces of the light blocking pattern BM define a trapezoidal cross-sectional shape.

The reflection wall 146 is adjacent to the side surface of the light blocking pattern BM and has a corresponding tilted or inclined profile. Upper and/or lower surfaces of the light blocking pattern BM and the reflection wall 146 may be substantially coplanar with each other, but are not limited thereto or thereby.

The light blocking pattern BM having the trapezoidal cross-sectional shape reflects more of the excited light emitted from the light excitation particle 142 near a boundary of a color area of the color conversion layer 147.

Figure 10:
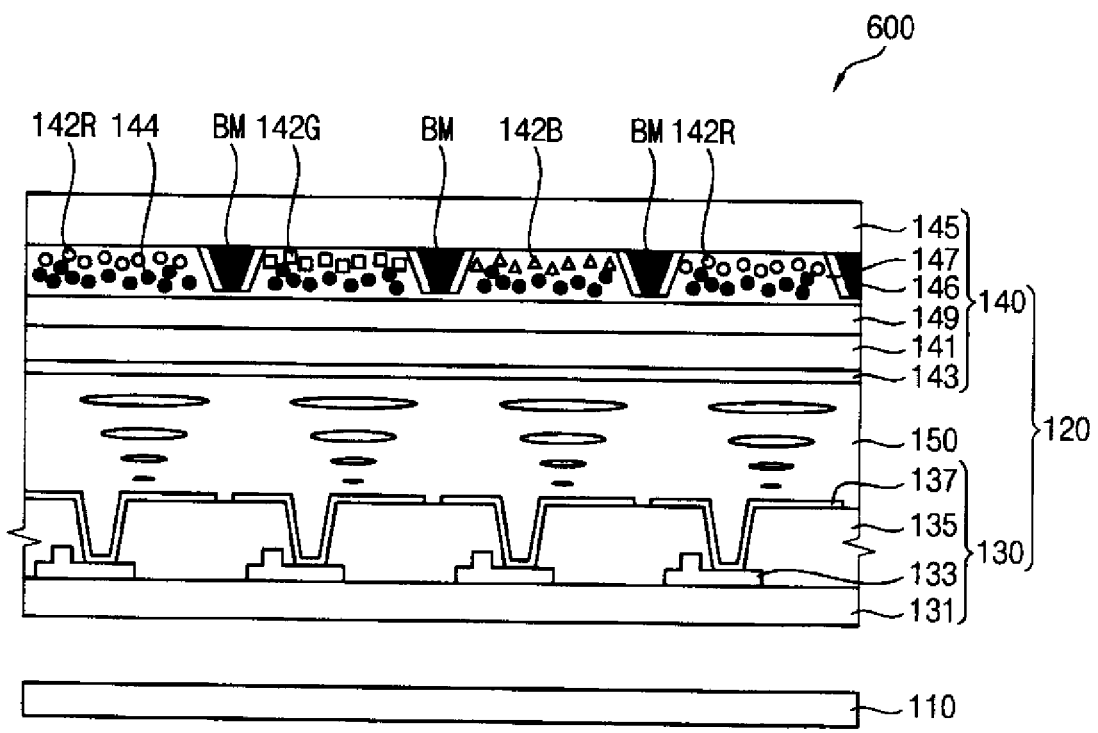
FIG. 10 is a cross-sectional view of another exemplary embodiment of a photoluminescent liquid crystal display device according to the invention.

FIG. 10 is a cross-sectional view of another exemplary embodiment of a PL-LCD device according to the invention.

Referring to FIG. 10, an exemplary embodiment of a PL-LCD device 600 according to the invention includes a backlight unit 110 and a photoluminescent panel 120 displaying an image in response to light from the backlight unit 110. The exemplary embodiment of the PL-LCD device 600 according to the invention is substantially the same as the PL-LCD device 100 of FIG. 1 except for cross-sectional shapes of a light blocking pattern BM and a reflection wall 146 within a color conversion layer 147. Hereinafter, detailed description of the identical elements is omitted.

The color conversion layer 147 of the photoluminescent panel 120 includes a light excitation particle 142, a scattering particle 144 and the reflection wall 146. The color conversion layer 147 may further include the light blocking pattern BM.

When viewed cross-sectionally, the light blocking pattern BM has a desired depth D and widths within the color conversion layer 147. An upper width UW of the light blocking pattern BM is substantially different from a lower width LW of the light blocking pattern BM. As illustrated in the exemplary embodiment of FIG. 10, the upper width UW of the light blocking pattern BM is wider than the lower width LW of the light blocking pattern BM. Also, the light blocking pattern BM has a tilted or inclined side surface. The depth D of the light blocking pattern BM is substantially equal to or less than depth of the color conversion layer 147. The inclined side surfaces and the substantially planar upper and lower surfaces of the light blocking pattern BM define a reverse trapezoidal cross-sectional shape.

The reflection wall 146 is adjacent to the side surface of the light blocking pattern BM, and has a corresponding tilted or inclined profile.

The light blocking pattern BM having the reverse trapezoidal cross-sectional shape reflects more of the excited light emitted from the light excitation particle 142 near a boundary of a color area of the color conversion layer 147.

What is claimed is:

1. A photoluminescent panel comprising:
    a lower substrate;
    an upper substrate facing the lower substrate and comprising a plurality of color areas spaced apart from each other by a gap therebetween; and
    a color conversion layer on the upper substrate, and comprising:
        a reflection wall provided in plural to define pairs of adjacent reflection walls among which first pairs of adjacent reflection walls define the color areas therebetween; and
        a flattening layer commonly disposed between each pair of adjacent reflection walls, the flattening layer comprising a base material layer in which a light excitation particle which absorbs light having a desired wavelength and emits excited light, and a scattering particle which scatters the excited light are distributed,
    wherein a same base material layer including a portion of the base material layer in which the light excitation particle is disposed extends from between the first pairs of adjacent reflection walls to be disposed at the gap between color areas.

2. The photoluminescent panel of claim 1, wherein the color conversion layer further comprises a first area in which the light excitation particle is disposed and a second area in which the scattering particle is disposed, and the first area is above the second area.

3. The photoluminescent panel of claim 1, wherein the color conversion layer further comprises a first area in which the light excitation particle is disposed and a second area in which the scattering particle is disposed, and the first area is below the second area.

4. The photoluminescent panel of claim 1, wherein the flattening layer disposed in the color areas spaced apart from each other further comprises a plurality of light excitation particles and a plurality of scattering particles interspersed with each other therein.

5. The photoluminescent panel of claim 1, wherein
    the color conversion layer further comprises a light blocking pattern, and
    the reflection wall is elongated in a substantially perpendicular direction with respect to a lower surface of the light blocking pattern.

6. The photoluminescent panel of claim 5, wherein
    a cross-sectional side surface of the light blocking pattern has a curved or a stepped shape,
    the reflection wall contacts and covers the cross-sectional side surface of the light blocking pattern, and
    an end portion of the reflection wall is elongated in the substantially perpendicular direction with respect to the lower surface of the light blocking pattern.

7. The photoluminescent panel of claim 5, wherein the light blocking pattern has a first width at an upper portion thereof and a second width at a lower portion thereof, and the first width is different from the second width.

8. The photoluminescent panel of claim 7, wherein
the light blocking pattern has a tilted cross-sectional side surface, and
the reflection wall contacts and covers the tilted cross-sectional side surface of the light blocking pattern.

9. The photoluminescent panel of claim 1, wherein the color conversion layer further comprises a plurality of light excitation particles emitting different color lights, the light excitation particles comprising at least two materials among a green phosphor, a red phosphor and a yellow phosphor.

10. The photoluminescent panel of claim 1, wherein the color conversion layer further comprises a plurality of light excitation particles emitting different color lights, the light excitation particles comprising at least two materials among a green quantum dot, a red quantum dot and a blue quantum dot.

11. The photoluminescent panel of claim 1, wherein the scattering particle comprises titanium oxide or silicon oxide.

12. A photoluminescent display device comprising:
a first substrate;
a second substrate facing the first substrate and comprising a plurality of color areas spaced apart from each other by a gap therebetween; and
a color conversion layer on the second substrate, and comprising
a reflection wall provided in plural to define pairs of adjacent reflection walls among which first pairs of adjacent reflection walls define the color areas therebetween; and
a flattening layer commonly disposed between each pair of adjacent reflection walls, the flattening layer comprising a base material layer in which a light excitation particle which absorbs light having a desired wavelength and emits excited light, and a scattering particle which scatters the excited light are distributed,
wherein a same base material layer including a portion of the base material layer in which the light excitation particle is disposed extends from between the first pairs of adjacent reflection walls to be disposed at the gap between color areas.

13. The photoluminescent display device of claim 12, wherein the color conversion layer further comprises:
a light blocking pattern which blocks the excited lights.

14. The photoluminescent display device of claim 13, wherein the reflection wall is elongated in a substantially perpendicular direction with respect to a lower surface of the light blocking pattern.

15. The photoluminescent display device of claim 12, further comprising an optical filter layer between the color conversion layer and the second substrate.

* * * * *